Jan. 10, 1950 — D. J. PARMESAN — 2,493,996
PIPE UNION
Filed Aug. 2, 1948

Inventor
Daniel J. Parmesan.
By E. V. Hardway.
ATTORNEY.

Patented Jan. 10, 1950

2,493,996

UNITED STATES PATENT OFFICE 2,493,996

PIPE UNION

Daniel J. Parmesan, Houston, Tex.

Application August 2, 1948, Serial No. 42,000

3 Claims. (Cl. 285—122)

This invention relates to a pipe union.

An object of the invention is to provide a union of the character described whereby sections of pipe or tubing may be quickly connected or disconnected with a novel type of seal between the coupling members for preventing leakage of fluid between said coupling members.

Another object of the invention is to provide a union of the character described having not only a metal seal between the coupling members but also having a seal ring embodied therein in a novel manner to break the joint between said coupling members.

The type of union herein described has been specially designed as a pressure seal, that is a seal which is specially adapted to prevent the escape of pressure fluid from the line connected by the union, although it is also effective as a suction seal, that is, it forms a perfect seal even though the pressure within the line may be below outside pressure.

Other objects and advantages will be apparent from the following specification which is illustrated by the accompanying drawings, wherein—

Figure 2:
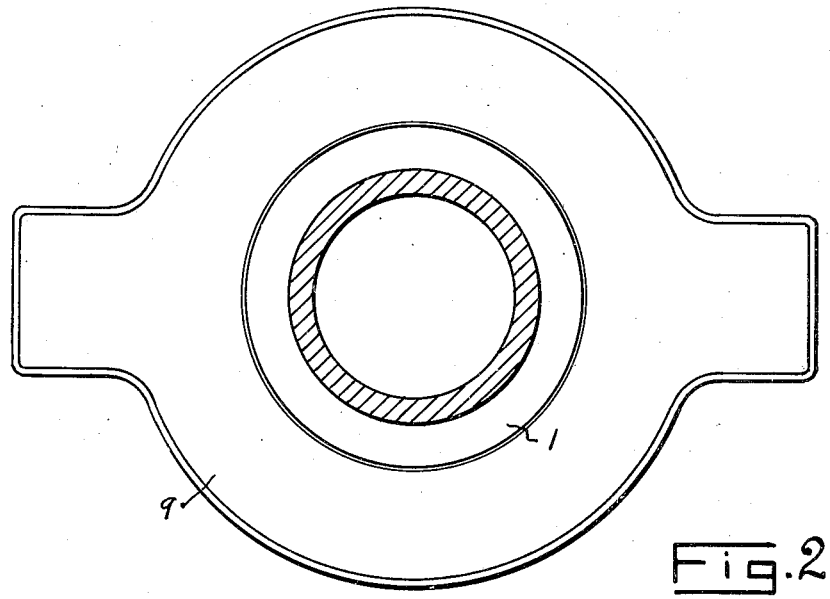
Figure 2 is a side elevation, partly in section.
Figure 1:
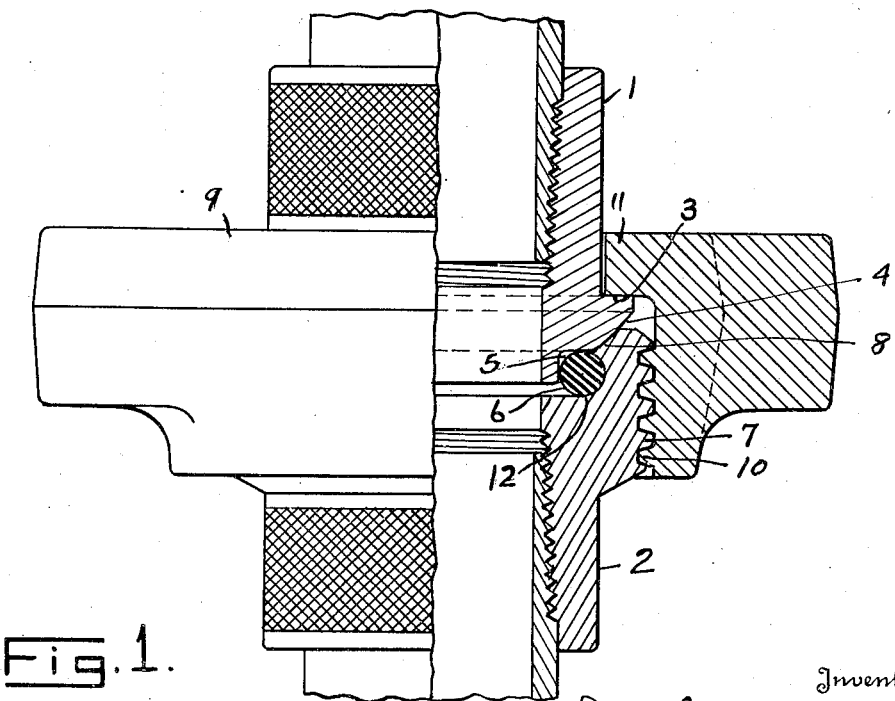
Figure 1 is a plan view of the union.

Referring now more particularly to the drawings the numerals 1 and 2 designate, respectively, the coupling members of the union whose outer ends are internally threaded for the connection of sections of pipe thereto as shown in Figure 1.

The inner end of the coupling member 1 is formed with an external annular shoulder 3 and beyond said shoulder, toward the inner end of the coupling member, said member has an external annular bearing surface 4 which is curved outwardly, toward the inner end of said member, all the way around as shown in Figure 1.

The extreme inner end of the coupling member 1 is provided with a groove 5 all the way around to receive a resilient seal ring 6.

The abutting end of the coupling member 2 is outwardly thickened and formed with coarse external threads 7 and has an inside outwardly flared, annular, curved face 8 which conforms in curvature to, and which fits closely against, the opposing face 4 so as to form a metal to metal joint when the coupling members are assembled.

There is a clamp nut 9 having coarse internal threads 10 adapted to intermesh with the threads 7 and also having an internal annular flange 11 which fits closely over the section 1 and which is engageable with the shoulder 3, when the threads are screwed home, to clamp the facing ends of the coupling members in abutting relation.

The inside diameter of the threads 10 is slightly larger than the outside diameter of the shoulder 3 so that the clamp nut 9 may be fitted over the coupling member 1 and the threads 10 screwed onto the threads 7.

The inner end of the coupling member 2 has an annular groove 12 therearound which is inwardly of, and adjacent, the curved face 8 and which is preferably semicircular in cross section to snugly receive the seal ring 6 and to clamp it into the groove 5 when the coupling members are assembled and connected together.

The seal ring 6 is formed of yieldable material and is exposed to the inside pressure of the fluid in the line. The opposing inner ends of the coupling members 1 and 2 are spaced apart so as to expose said seal ring to said pressure.

Normally the metal to metal seal will prevent the escape of the pressure fluid whether the coupling members are axially aligned or misaligned, but in case they should not be in perfect contact the seal ring 6 will break the joint between them to prevent the escape of pressure fluid and said seal ring is so mounted between said coupling members that it may be distorted, under the influence of fluid pressure, to form a better seal irrespective of the degree of pressure outside or inside of the line.

What I claim is:

1. A union comprising, two tubular coupling members, one having an outwardly curved annular, external face and an external, annular groove inwardly of said face, and the other coupling member having an internal, curved flared face which fits closely against said external face outwardly of said groove, said other coupling member also having an annular groove, said grooves registering, a resilient seal ring seated in said grooves, the adjacent ends of said coupling members, inwardly of the grooves, being spaced apart, to expose said resilient seal ring to the internal pressure within the coupling members and means securing said coupling members together.

2. A union comprising, two tubular coupling members, one having an outwardly curved, annular, external face and an external, annular groove inwardly of said face, the sides of said groove being in an angular relation to each other, and the other coupling member having an internal, annular outwardly flared curved face which fits closely against said external face and also having an internal annular groove which registers with the other groove, said contacting faces forming a seal between the coupling members, a resilient seal ring in said grooves, the adjacent ends of the coupling members being spaced apart to expose the resilient seal ring to internal pressure and means securing said coupling members together.

3. A union comprising, two tubular coupling members, one having an annular tapering external face and an external, annular groove inwardly of said face and the other coupling member having an internal, annular outwardly flared face which fits closely against said external face and also having an internal annular groove which registers with the other groove, said contacting faces forming a seal between the coupling members, a resilient seal ring secured in said internal groove and positioned to fit into the other groove when the coupling members are secured together, the adjacent ends of the coupling members being spaced apart to expose the resilient seal ring to internal pressure and means securing said coupling members together.

DANIEL J. PARMESAN.

REFERENCES CITED

The following references are of record in the file of this patent:

UNITED STATES PATENTS

| Number | Name | Date |
|---|---|---|
| 904,673 | Bidekov | Nov. 24, 1908 |
| 1,563,836 | Copp | Dec. 1, 1925 |

FOREIGN PATENTS

| Number | Country | Date |
|---|---|---|
| 247,105 | Great Britain | Feb. 11, 1926 |